Patented Mar. 12, 1946

2,396,342

UNITED STATES PATENT OFFICE 2,396,342

WATERPROOFING COMPOSITION

Augustus B. Quick, East Norwich, N. Y.

No Drawing. Application February 11, 1944,
Serial No. 522,203

3 Claims. (Cl. 260—4)

My invention relates to waterproofing compositions and methods of manufacture, and more particularly to a penetrative liquid composition which upon application to materials to be waterproofed will deposit in and upon the material a non-brittle, adherent, highly water-repellent coating.

In various of the waterproofing compositions made heretofore, rosin and metallic soaps have been used. The metallic soaps are subject to the disadvantage of drying out after a relatively short period of use and accordingly are subject to removal as a dust or powder. Rosin has the disadvantage of forming a brittle surface coating which is subject to fracture and chipping when the composition dries on the treated material.

In accordance with my present invention I have discovered that a satisfactory waterproofing composition may be made containing metallic soaps, chlorinated rubber to improve the waterproofing effect, and special resins, while avoiding the above described disadvantages and limitations characteristic of the prior compositions. I have found that, if the metallic soaps are reduced to colloidal condition or dissolved in a volatile solvent in combination with the chlorinated rubber and special resins hereinafter described, the resulting composition will produce a waterproof film which is flexible, tightly adherent and very efficient in resisting and repelling water.

To produce a composition of the required properties the resin must be carefully selected. The only resins known to me which are satisfactory for the present purpose are those made from terpenes by hydrogenation, chlorination, or polymerization or by a combination of these modifying processes. These resins are known as polyterpene resins. Thus, there may be used any such resinous terpene product made as described in U. S. Patent 2,302,664 issued to William H. Carmody or U. S. Patent 2,320,718 issued to Frank W. Corkery and Samuel G. Burroughs. For convenience resins of this kind are referred to herein as modified terpene resins.

An example of such a modified terpene resin that I have used to advantage is one known by the trade name Flexo-Resin, this particular resin having a melting point ranging from room temperature or slightly below up to about 75° C.

From this class of resins there is selected one of melting point or consistency to suit the particular purpose for which a batch of my composition is to be used. Thus, the lower melting terpene resins or members of the class that are oily liquids at ordinary temperature are preferred when it is desired that the finished waterproofing composition should be particularly soft, as for application to paper or other products that are to be repeatedly flexed. The higher melting resins of this class are chosen when it is desired to make a harder waterproofing composition that while it may be flexed in film form is not as pliable as those made with the oily liquids.

It should be understood, however, that by the use of any of these terpene resins as described herein I make a waterproofing composition that in film form is not only extremely effective in decreasing penetration by water but also sufficiently pliable to meet practically any condition. Even the relatively harder compositions of the present invention, such as used on brick or masonry construction, when separated from the base material will be found to bend without breaking.

I have also discovered that the flexibility can be augmented advantageously and new results produced by incorporating with the terpene resin a relatively small amount of a non-volatile plasticizer which is also preferably water-repellent. Satisfactory forms of this latter type of material are the solid natural fats or fatty oils which have been hydrogenated to solid form. Specific examples of these materials are stearine, stearic acid and solid hydrogenated vegetable and fish oils.

The solid glycerides, I have found, have a softening and plasticizing effect upon the terpene resins and also assist in preventing the water insoluble soaps in the composition from becoming dried out and non-adherent. In other words, the soaps, terpene resin, and plasticizing agents of my composition coact to produce a uniform, flexible, tightly adherent waterproof film when the composition is applied and dried. As the plasticizer I may use also a small amount of certain fatty oils such, for example, as china wood, perilla, and oiticica oil. These oils, as well as the solid plasticizing agents such as the solid glycerides may be incorporated in the composition in an amount varying generally between about ½% and 2½%.

Briefly stated, my improved waterproofing composition comprises a terpene resin, chlorinated rubber, a water insoluble and water repellent metallic soap such as aluminum stearate, and preferably also a plasticizing agent of a fatty nature, the latter being added when the particular use to which the composition is to be put requires improved flexibility over that of the composition made without the addition of the plasticizer.

For most purposes the composition is used and also shipped in the form of a solution of these non-volatile ingredients in a suitable volatile solvent medium.

Particularly satisfactory results are obtained when the solvent consists largely of a volatile fraction of petroleum hydrocarbons as, for instance, cleaner's naphtha, hydrogenated naphtha or the like. Thus, I have used to advantage a hydrogenated naphtha known by the name Solvesso 2 in conjunction with a naphtha of high flash point known as Varsol. The Varsol is a commercial petroleum distillate having a gravity of at least 45° A. P. I. It is about 95% volatile at 392° F. Solvesso 2 is a hydrogenated petroleum distillate of A. P. I. gravity 34° and boiling range of about 275° to 365° F.

The addition of a small proportion of alcohol to the solvent medium has been found to be very desirable, in decreasing the tendency of the solution of the waterproofing composition to gel. This effect of the alcohol is illustrated, for example, in that method of manufacturing my composition in which the aluminum strearate is first dissolved in petroleum hydrocarbon solvents at a temperature of about 170° F. With usual proportions of aluminum stearate, a solution made at the elevated temperature tends to gel. This product is cooled to a point below the boiling point of alcohol and then a small proportion of alcohol is stirred into the composition; the effect is conversion of the gel to a flowable liquid.

The ethyl alcohol is preferred as the antigelling agent to be used as described. In place of this alcohol there may be used isopropyl alcohol or tertiary butyl alcohol, or other low boiling aliphatic alcohol, ethanol or denatured alcohol of any usual formula being preferred for the purpose.

In general, the proportions of the essential ingredients of my improved waterproofing composition may be varied to fit the properties to those that are desired for a special use. Suitable proportions and also those that are preferred are shown in the following table:

| Ingredient used | Suitable proportions | Preferred proportions |
| --- | --- | --- |
|  | Parts | Parts |
| Modified terpene resin | 15–55 | 20–40 |
| Chlorinated rubber | 15–55 | 20–40 |
| Water repellent metal soap | 5–50 | 10–40 |
| Plasticizer | 0–30 | 10–20 |
| Volatile solvent | As desired | As desired |

The volatile solvent used in reducing the non-volatile ingredients to solution or colloidal dispersion is ordinarily about 3 to 7 parts of the solvent for 1 part of the non-volatile ingredients present. Somewhat more or less solvent than this may be used, as for instance 2–20 parts of the solvent to 1 of non-volatile materials, the smaller proportion of solvent giving a viscous solution of high concentration and the larger proportion of the solvent giving thinner and more dilute solutions that are useful when the waterproofing composition is to be applied to difficultly penetrable materials.

The proportion of aliphatic alcohol to be added to the hydrocarbon solvent medium to reduce the gelling, as referred to above, is ordinarily about 1 to 3% of the alcohol on the weight of the hydrocarbon solvent. More alcohol may be used, although the extra advantage so obtained does not ordinarily offset the increased cost of the use of the additional proportion of alcohol. The alcohol may be omitted altogether in those rare cases in which the gelling of the composition is not objectionable for a particular purpose or in case the composition is to be made into an emulsion with the solvent.

The following specific formulas will further illustrate the compositions of my invention:

Example 1

|  | Per cent |
| --- | --- |
| Aluminum stearate | 4 |
| "Flexoresin" | 3 |
| Solid glyceride | 1 |
| Hydrocarbon solvent | 92 |
|  | 100 |

Example 2

|  | Per cent |
| --- | --- |
| Aluminum stearate | 3 |
| "Flexoresin" | 3 |
| Chlorinated rubber | 3 |
| Glyceride | 1 |
| Hydrocarbon solvent | 90 |
|  | 100 |

Example 3

| Ingredient used | Formula | | | |
| --- | --- | --- | --- | --- |
|  | A | B | C | D |
|  | Per cent | Per cent | Per cent | Per cent |
| Aluminum stearate | 2.5 | 1.5 | 3.0 | 4.5 |
| Hydrogenated fat | 2.5 | 1.5 | 2.0 | 2.0 |
| Chlorinated rubber (granulated) | 2.5 | 5.0 | 10.0 | 1.5 |
| Modified terpene resin | 3.5 | 7.0 | 10.0 | 2.5 |
| Solvent | 88.0 | 84.0 | 74.0 | 88.0 |
| Denatured alcohol | 1.0 | 1.0 | 1.0 | 1.5 |
| Total | 100.0 | 100.0 | 100.0 | 100.0 |

In these formulas immediately above the modified terpene resins used were Flexo-Resins. In the Formulas A, B, C, and D, respectively, the Flexo-Resins used were of melting points 75° C., 63° C., 48° C., and below room temperature.

In these Formulas A–D, the solvent in each case may be a petroleum distillate, toluene, xylene, carbon tetrachloride, or a mixture of two or more of them. Carbon tetrachloride is the preferred solvent only when the proportion of the chlorinated rubber is high as in Formula C. Here the use of carbon tetrachloride is desirable in improving the solvent power for the large proportion of chlorinated rubber used.

In place of the aluminum stearate used in the above examples, any of the other equivalent commonly used water repellent metal soaps may be substituted, for example, the oleates and palmitates of aluminum and the stearates, oleates and palmitates of zinc or calcium.

The waterproofing composition of my invention may be prepared in various ways including dissolving or dispersing the solid constituents in a thin, penetrative solvent at the beginning of the process or the solid materials may be fused or intimately admixed by heating without solvent, the solvent in that case being added later to effect uniform dispersion and proper dilution of the composition.

The composition in the examples above may be prepared by continuously heating all of the ingredients together until solution takes place, although the alcohol is preferably added after heating, to avoid losses. An advantageous process of preparing the compositions is first to warm the metal soap in the volatile solvent medium, say to about 170° F., to form a solution, cool the solution to decrease loss of solvent by evaporation, and then stir in the other ingredients.

The compositions may also be prepared advantageously by melting the modified terpene resin with the chlorinated rubber and plasticizing or softening agent, e. g. fatty glycerides, and then incorporating the water repellent soap. After this is accomplished, the desired amount of solvent may be added. If it is desired to have the final composition in solid form, the addition of solvent may be omitted at the time of the initial preparation of the composition.

The fatty oils, such as China wood, oiticica and perilla oil, which provide the desired softening plasticizing action on the resin, metal soap, and chlorinated rubber may be used for that purpose, either in place of or in addition to the above described solid fatty materials.

The compositions of my invention may be used for waterproofing practically any desired material, as, for instance, stone, cement, brick, wood, leather, fabrics, and paper. When applied to porous materials the solvent medium carries the composition of water repellent solids or semi-solids into the pores of the material and coats the individual particles with a highly water repellent film. The solid constituents in the compositions are either dissolved or dispersed in microscopic sizes in the solvent medium so that the liquid is substantially transparent, free-flowing and penetrative in character. This material may also be incorporated in ordinary oil paints in varying percentages as desired. For example, good results may be had using from 5% to 20% of my material in place of a part of the usual paint thinner. My composition also is valuable for rust proofing metals.

This application is a continuation in part of my copending application for United States Patent No. 346,179, filed July 18, 1940.

It will be understood also that it is intended to cover all changes and modifications of the example of the invention herein chosen for the purpose of illustration which do not constitute departures from the spirit and scope of the invention.

What I claim is:

1. A waterproofing composition comprising chlorinated rubber, a polyterpene resin, a water-insoluble and water-repellent metal soap, a fatty glyceride plasticizing agent, and a volatile solvent, the proportion of the several ingredients by weight being as follows: chlorinated rubber 15 to 55 parts, polyterpene resin 15 to 55 parts, metal soap 5 to 50 parts, volatile solvent in amount to dissolve the other ingredients to form a solution, said glyceride in amount about 1.5 to 2.5 parts for 100 parts of the whole composition, and the proportion of polyterpene resin being selected within the range stated so that the whole composition after evaporation of the volatile solvent is a solid.

2. A composition as described in claim 1, the chlorinated rubber, modified terpene resin, and metal soap being present in approximately equal proportions.

3. A composition as described in claim 1, including a volatile aliphatic alcohol serving to prevent gelling of the composition.

AUGUSTUS B. QUICK.